June 9, 1936.  O. E. DROEGE  2,043,372

METHOD OF TREATING EGGS

Filed May 8, 1933

WITNESS

Orville E. Droege
INVENTOR

BY
ATTORNEY

Patented June 9, 1936

2,043,372

UNITED STATES PATENT OFFICE 2,043,372

METHOD OF TREATING EGGS

Orville E. Droege, Chicago, Ill., assignor to Industrial Patents Corporation, Chicago, Ill., a corporation of Delaware Application May 8, 1933, Serial No. 669,852

5 Claims. (Cl. 99—113)

This invention relates to a method of treating eggs which have been removed from the shell. One of the objects of this invention is to produce a homogeneous egg product. Other objects of the invention will be apparent from the description and claims which follow.

In the production of a homogeneous frozen egg product such as frozen yolks, frozen whites or frozen mixed eggs, it is desirable that all germs, membranes, strings or chalazae be thoroughly broken up and admixed with the product. Screen methods for removal of germs, membranes, strings or chalazae effect only partial removal and involve loss of egg substance. It is necessary, particularly in the case of frozen yolks or frozen mixed eggs that the yolks be thoroughly broken up. Failure to thoroughly break up the yolks results in an undesirable product. Mere mixing and beating methods commonly employed in breaking down yolks in mixed whole eggs and yolks prepared for freezing cause air to be beaten into the mix, which is undesirable.

The present invention contemplates a positive breaking down of egg yolks and a positive comminution of the germs, membranes and strings or chalazae. Suitable equipment for carrying out the present invention is illustrated in the accompanying drawing in which.

Figure 1:
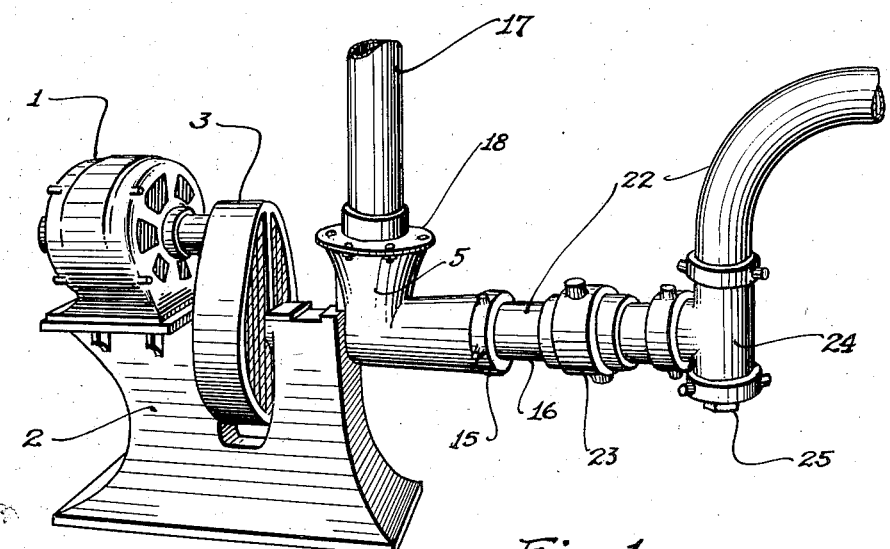
Figure 1 is a perspective view of such equipment.
Figure 2:
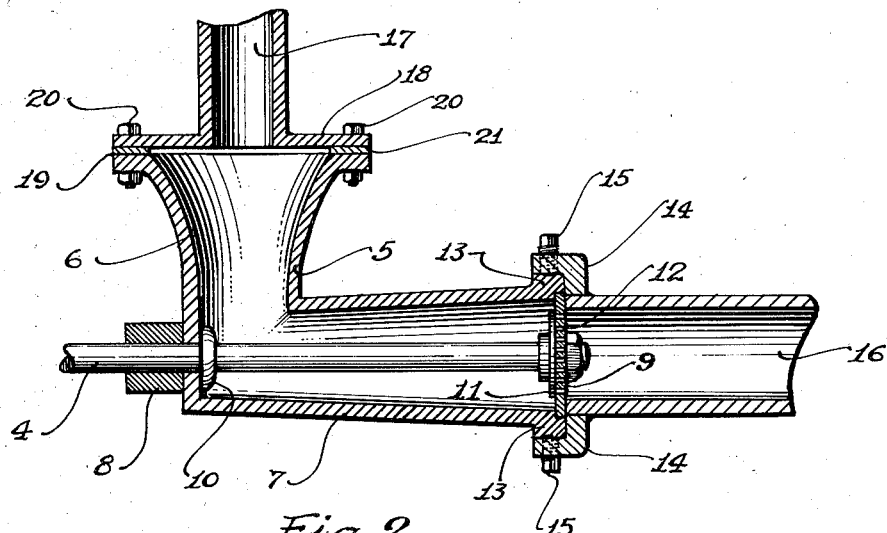
Figure 2 is a cross-sectional view through the cutting or grinding device.

In Figure 1 the motor is appropriately mounted on standard 2 and is connected through a speed reducer in gear box 3 with shaft 4 shown in Figure 2. Casing 5 which consists of bowl 6 and sleeve 7 is suitably fixed to standard 2. Shaft 4 rotates in sleeve 7 being supported in bearings 8 and 9, and is provided with thrust collar 10 and knife 11. Perforated plate 12, which is provided with bearing 9, is held in collar 13 of casing 7 by lock ring 14 secured to collar 13 as by bolts 15. Lock ring 14 is welded to pipe 16. Pipe 17, provided with flange 18, is bolted to the upper edge 19 of bowl 6 by bolts 20. Gasket 21 is provided to effect a seal. Pipe 16 is connected with the main line 22 leading to the tank by a union joint 23. T 24 provided with clean-out plug 25, is inserted in line 22. In the operation of the apparatus, eggs from which the shells have been removed are carried from a pump, not shown, through pipe 17 to bowl 6 and are forced under pressure through sleeve 7 and passed through knife 11 and perforated plate 12, being drawn off to a tank or other storage receptacle, not shown, through pipe 16 and line 22. The knife 11 and the plate 12 cooperate in the manner usual in hashers and exert a positive cutting action on membranous material present in the eggs.

In practice I have successfully used a plate with 3/64 inch holes in the hasher. This size plate gives a fine division of the membranous material such that the eggs which have passed through the hasher carry the finely divided membranous material in an emulsified state.

It will be understood that any similar type of equipment would be satisfactory for use in carrying out the process of the present invention, it being important, however, that the equipment be sealed against leakage to prevent admixture of air during the process of breaking down the eggs. Pumping the eggs into the hasher greatly increases the hasher capacity without decreasing its effectiveness in breaking down the germs, membranes and strings or chalazae.

This invention contemplates a positive comminution of the germs, membranes, and strings or chalazae by a cutting action, the material to be comminuted being carried through the cutting elements with the main liquid egg body.

The term "eggs" as used in the appended claims includes whole eggs, egg whites and egg yolks which have been removed from the shell either separately or mixed. The term "membranous material" as used in the appended claims includes germs, membranes, yolk sac, chalazae and similar material normally present in whole eggs, egg whites, or egg yolks which have been removed from the shell.

The term "positively cutting" as used in the claims shall be understood as including only the controlled cutting secured by the cooperative action of the perforated plate and the revolving knives in contradistinction to the random cutting that might be secured, for example, by agitator blades or knives revolving freely in a menstruum which it is desired to mix or cut.

I claim:

1. The method of treating eggs which consists in passing the egg material, under pressure, sealed from the atmosphere, through positively cutting elements positioned transversely to the line of flow of the egg material adapted to comminute the membranous material.

2. The method of treating eggs which comprises positively cutting the membranous material into fine particles by passing through a perforated plate cooperating with a rotatable knife while the membranous material is carried through a closed line in suspension in the liquid constituents of the eggs.

3. The method of treating eggs which consists in pumping all portions of a quantity of eggs in a closed line through positively cutting elements whereby the membranous material is finely divided and emulsified in the liquid egg body.

4. The method of treating eggs containing membranous material, which comprises forcing all portions of the eggs through a closed line and finely comminuting said membranous material while said membranous material is being carried through said closed line suspended in said eggs, by a cutter positioned transversely of said closed line.

5. The method of treating eggs containing membranous material, which comprises forcing a quantity of the eggs through a closed line, finely comminuting said membranous material while said membranous material is being carried through said closed line suspended in said eggs, and emulsifying said finely comminuted membranous material in the liquid body of said eggs, the said comminution of the membranous material and the emulsifying of the comminuted membranous material in the liquid egg body being effected by the action of a cutter positioned transversely of the line of flow of said eggs through said closed line acting upon all portions of the egg passing through said closed line.

ORVILLE E. DROEGE.